Dec. 21, 1965      J. GIGON ETAL      3,225,196
DEVICE FOR MEASURING DOSES OF THERMAL NEUTRONS
Filed Nov. 6, 1958
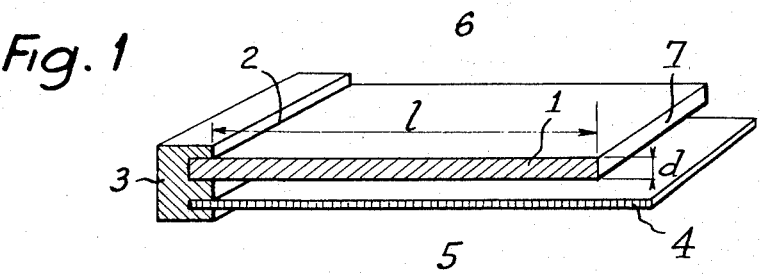
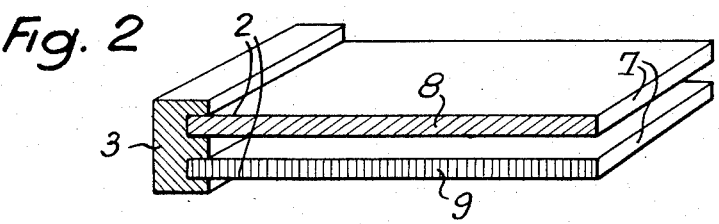
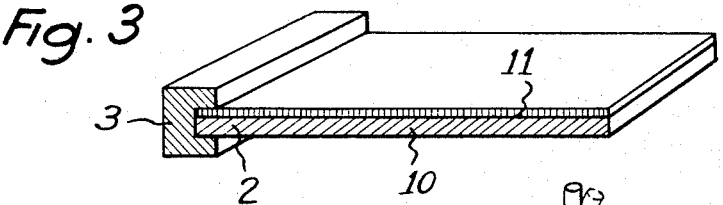
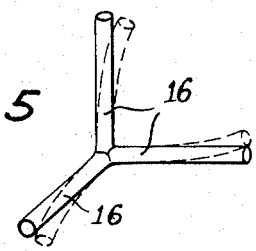
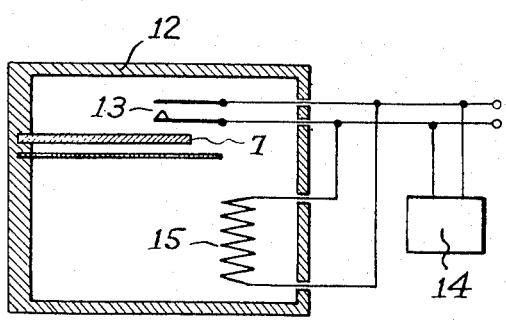
INVENTORS
Jean Gigon
Guy Mayer
BY Bacon & Thomas
ATTORNEYS United States Patent Office 3,225,196
Patented Dec. 21, 1965

3,225,196
DEVICE FOR MEASURING DOSES OF
THERMAL NEUTRONS
Jean Gigon, Romorantin, and Guy Mayer, Paris, France, assignors to Commissariat a l'Energie Atomique, Paris, France
Filed Nov. 6, 1958, Ser. No. 772,376
Claims priority, application France, Nov. 8, 1957, 751,191
10 Claims. (Cl. 250—83.1)

The present invention relates to an improved device for measuring doses of thermal neutrons.

The physical phenomena which occur in the deformation of solids subjected to a neutron flux may be divided into:

(A) A nuclear phenomenon: in certain atomic nuclei, such as lithium ($_3Li^6$), boron ($_5B^{10}$), uranium ($_{92}U^{235}$), etc., the "thermal" neutrons (that is to say neutrons slowed down until their energy is only of the order of an electron-volt) are absorbed and cause fission which produces several high-energy ions (of the order of 1 million electron-volts or a mev. for $_3Li^6$ and $_5B^{10}$ and 100 mev. for $_{92}U^{235}$): as a result of this absorption, a thermal neutron flux becomes progressively weaker as it penetrates a solid containing such nuclei, the weakening being an exponential function of the penetration.

(B) An interatomic phenomenon: the ions arising from the fission and having an energy of the order of 1 mev. lose their energy in the lattice of atoms constituting the solid in which they have been produced, displacing a certain number of the atoms along their trajectory which is of the order of 10 microns. The lattice thus altered by these displacements undergoes a variation in density which is a function at each point of the proportion of atoms displaced (defect density). The indication and extent of this variation depend on the nature of the body in question.

(C) A macroscopic mechanical phenomenon: if a solid sample undergoes a treatment affecting its density in a non-homogenous manner, it is deformed under the influence of the stresses thus created. Thermal bi-plates are examples of these phenomena.

Owing to the existence of the first two phenomena, when solids containing nuclei in which thermal neutrons cause fission are homogenously irradiated with thermal neutrons, these solids undergo a homogenous variation in density and thus in dimensions, which is a function of the neutron flux received during a given period of time; this neutron flux received by a body during a given period is called a "dose."

The object of the present invention is to provide a device for measuring doses of thermal neutrons, which utilises the measurable deformations or stresses appearing in an element sensitive to these neutrons.

Such a device is characterised substantially in that the said deformations or stresses, which are of a macroscopic mechanical nature and thus easily noticeable, are produced by heterogeneous irradiation of samples having initially a homogenous nuclear structure.

A definite deformation or stress is thus obtained, as a function of the dose received by the sensitive sample; according to the nature and the dimensions of the sample used, it is thus possible to produce apparatus for measuring doses (dosimeters) and neutron flux of different sensitivities.

These sensitive samples, which are generally of small dimensions, may be used for measuring flux either in nuclear reactors or in the vicinity of localised sources, such as radium-beryllium sources or accelerator targets.

They also have the advantage of being able to convert the dose received, that is to say the flux integrated in relation to time, directly into a mechanical deformation of the sensitive elements; this dose may also be converted into a measurable force exerted on an element which opposes the deformation.

Several embodiments of the invention, to which the latter is not intended to be limited, are illustrated in the accompanying diagrammatic drawings, in which:

FIG. 1 shows a dosimeter plate according to the invention.

FIGURE 2 shows another arrangement of dosimeter plates.

FIGURE 3 shows a modification of the invention, in which the materials used for the dose-measuring do not produce fission ions under the influence of neutron irradiation.

FIGURES 4 and 5 show particular uses of dosimeter elements.

The device shown in FIGURE 1 consists of a plate 1, plane before irradiation, having the length "$l$" and thickness "$d$" and fixed at its end 2 in a base 3.

A screen 4, consisting of a material which absorbs thermal neutrons and adapted to protect the plate 1 from any thermal neutrons emanating from the region 5, is arranged in such a manner that the plate 1 is irradiated only by the neutrons emanating from the region 6.

To assist understanding of the invention, the screen 4 has been shown spaced from the plate 1, but it can be joined to it without being integral therewith so as to form with it, particularly in the direction of its thickness, an anisotropic whole, the irradiation of which will thus likewise be anisotropic.

Calculation and experiment show that if the plate has a small thickness in relation to its other dimensions, it shows under the influence of anisotropic irradiation, a circular curvature on condition that it is not subjected to an external stress. If the effect of irradiation on the material of the plate is a contraction, the parts nearest the region 6 will have a greater tendency to contract and the concavity of the plate will be towards this region; if the effect is an expansion, the concavity of the plate will be towards the region 5. Through the static theory of elasticity it can be shown that the curvature of the plate is given by the formula:

$$\frac{l}{R} = 6 \frac{\Delta^{(q)}}{\lambda} \frac{l^2}{d^2} \frac{2(1-e^{\lambda d}) - \lambda d(1+e^{\lambda d})}{\lambda d}$$

in which:

R is the radius of curvature;

$\lambda$ is the weakening of the neutron flux as a function of the thickness of the plate traversed;

$\Delta^{(q)}$ is the relative elongation undergone by a sample consisting of the same material as the plate but of very small dimensions before $l/\lambda$ (homogenous irradiation under the effect of an irradiation $q$ evaluated in neutrons per square centimetre;

$d$ is the thickness of the plate;

and on condition that:

1—the material of the plate is such that each neutron absorbed causes fission of the type defined above;
2—that the modulus of elasticity of the plate (Young's modulus) does not change substantially under the effect of irradiation.

If the length of the plate is "$l$," its end 7 undergoes a displacement given by the following formula, whilst the radius of curvature remains relatively large:

$$x = \frac{l2}{2R}$$

In the case of a glass plate charged with 60% by weight of boron trioxide ($B_2O_3$), 7 cm. long and $5.10^{-2}$ cm. thick and the coefficient $\lambda$ of which equals 20 cm.$^{-1}$, a displacement $x$ equal to 0.1 cm. can be observed at 50° C. for a dose of $8.10^{14}$ neutrons per square centimeter.

To produce the same displacement by mechanical means, a force of approximately 6 grams would need to be exerted on the end of the plate.

In this example, the screen 4 is a sheet of cadmium of $10^{-2}$ cm. thickness, which shuts off practically all the thermal neutrons coming from the region 5.

FIGURE 2 illustrates another arrangement according to the invention. Two identical plates 8 and 9 are fixed by their ends 2 in a support 3. The material of which they are made and their thickness are so selected that the mean free path of the termal neutrons in these plates is smaller than their thickness; each plate thus serves as a screen to the other and consequently is irradiated anisotropically.

The variation in distance between the ends 7 of the two plates, due to their deformation, measures the quantity of neutrons received.

FIGURE 3 shows diagrammatically another arrangement which makes it possible to obtain deformations of plates which do not contain nuclei producing fission ions; it covers practically all substances having mechanical properties which enable them to have the form of a plate.

The plate 10, fixed by its end 2 in the support 3, is covered with a layer 11 containing a fissile substance such as boron ($_5B^{10}$), lithium ($_3Li^6$), etc. The plate 10 does not contain nuclei producing fission ions, the layer 11 does.

In the drawing, the thickness of the layer 11 is exaggerated in relation to the thickness of the plate 10 to facilitate understanding.

Some of the ions created in this layer 11 by the thermal neutrons reach the plate 10 and displace the atoms therein, which causes mechanical deformations similar to those produced in plates containing fissile nuclei, owing to the anisotropic creation and propagation of the ions caused by providing the layer 11 on only one face of the plate 10.

The substance used to make either the plates 1 or 8 and 9 or the layer 11, is preferably chosen so as not to produce toxic fission products; for this reason uranium or plutonium should not be used.

Moreover, elements which absorb the neutrons without creating rapid ions only reduce the sensitivity of the dosimeters.

For these reasons it is preferable to make use of the salts of lithium ($_3Li^6$) to produce rapid ions or, better still, the salts of boron ($_5B^{10}$), the mechanical properties of which are better.

The plates 1, 8 and 9 may be of tetraboron carbide ($B_4C$), the properties of which are practically independent of temperature.

The plates 1, 8 and 9 may also be made of glass; the use of this type of material is convenient, because $_3Li^6$ and $_5B^{10}$ may be introduced therein in variable proportions.

Natural boron contains 19% of the isotope $_5B^{10}$ as against 7.5% of the isotope $_3Li^6$ in natural lithium; the sensitivity may be increased by using boron enriched with $_5B^{10}$ by known means.

The function of relative elongation $\Delta(q)$ of the tetraboron carbide plate, described above, remains substantially linear as a function of the dose $q$ for the values of $\Delta(q)$ substantially equal to $10^{-2}$; in this region of linearity the quantity $$\frac{\Delta(q)}{\lambda q}$$

is $10^{-20}$ cubic centimeters per neutron for irradiations effected between 20° C. and 100 C.

Re-heating, consisting of heating the plate above the irradiation temperature, removes the deformations by thermal rearrangement; the dosimeter is thus "returned to zero."

The dilatometric plates according to the invention may be used to exert a certain mechanical force for the purpose of starting a relay.

In one embodiment of the plates according to the invention, one of the devices described above is introduced into an electrically heated vessel (FIGURE 4). The complete unit is then placed in a nuclear reactor.

When the free end 7 of the plate reaches a predetermined deformation, it closes electric contacts 13 which are used for two purposes:

(1) for actuating a device 14 to warn the operators that a predetermined dose of irradiation has been reached;

(2) for starting a vessel-heating means 15 which cancels the effects of irradiation and returns the dosimeter to zero.

Another application shown in FIGURE 5 comprises cylindrical rods 16, when the neutron flux is anisotropic. The concavity of the deformed rod is towards the side from which the greatest flux comes, if the effect of the irradiation is a contraction. Three of these rods 16 are fixed at a common point so as to form, before irradiation, a trirectangular trihedral, the deformations of which provide vectorial information on the flux at this point.

What we claim is:

1. An analyzer for neutrons comprised of a glass body having a plurality of glass parts with different density response to neutrons, and means to measure the deformation of the body under irradiation.

2. Device for measuring doses of thermal neutrons including an integral body of material having initially a homogeneous nuclear structure but subject to permanent and continuing deformation when subjected to radiation, means for subjecting said sample to a continuing heterogeneous irradiation, and means rendering deformations caused by the said irradiation detectable whereby the total dose received may be measured.

3. Device as claimed in claim 2, wherein said body is constituted by a plate composed of material which will absorb the thermal neutrons, and a screen made of material which shuts off thermal neutrons, said screen being positioned adjacent one face of said plate whereby to shield said one face from radiation.

4. Device as claimed in claim 3, wherein there are two bodies composed of plates made of material absorbing thermal neutrons arranged facing one another such that each serves as the said associated screen for the other.

5. Device as claimed in claim 2, wherein said body consists of a plate of non-fissile material and is covered on one face with a thin layer of material which does contain a fissile substance.

6. Device as claimed in claim 2, wherein said body is located inside a container which is provided with heating means arranged to be actuated in response to a predetermined deformation of said body whereby when a predetermined dose has been received by the body it is heated to return it to its initial undeformed state.

7. An analyzer for neutrons comprised of a glass body having a plurality of glass parts with different density response to neutrons and having the adjacent surfaces of said glass parts tightly adhered to each other.

8. An analyzer for neutrons comprised of a glass body having a plurality of glass parts with different density response to neutrons, and means to measure the dimensional response of the body to irradiation.

9. A method of determining the quantity of neutrons passing through an area that comprises inserting in said area a glass body having differential density response to neutron radiation and, hence, which possesses the property of deforming under irradiation by neutrons, irradiating the glass body for a predetermined period of time, and measuring the amount of deformation which the glass body has undergone in that period.

10. A method of restoring glass, which has been deformed by density change by neutron bombardment to its original form that comprises heating the distorted glass until it resumes its form.

References Cited by the Examiner

UNITED STATES PATENTS

| 2,677,772 | 5/1954 | Moon | 250—83 X |
| 2,714,668 | 8/1955 | Zinn | 250—83 |
| 2,904,487 | 9/1959 | Dickson | 250—83.1 X |

RALPH G. NILSON, *Primary Examiner.*